United States Patent
Ueda et al.

(10) Patent No.: US 7,449,510 B2
(45) Date of Patent: Nov. 11, 2008

(54) BIODEGRADABLE POLYESTER RESIN COMPOSITION, PROCESS FOR PRODUCING THE SAME AND FOAMED ARTICLE AND MOLDED ARTICLE USING THE SAME

(75) Inventors: Kazue Ueda, Uji (JP); Fumio Matsuoka, Uji (JP); Akinobu Ogami, Uji (JP); Tatsuya Matsumoto, Uji (JP); Takuma Yano, Uji (JP); Kazuko Yoshimura, Uji (JP); Kazunobu Yamada, Uji (JP); Masami Okamoto, Otsu (JP)

(73) Assignee: Unitika Ltd., Hyogo (JP)

( * ) Notice: Subject to any disclaimer, the term of this patent is extended or adjusted under 35 U.S.C. 154(b) by 419 days.

(21) Appl. No.: 10/555,139

(22) PCT Filed: May 12, 2003

(86) PCT No.: PCT/JP03/05914

§ 371 (c)(1),
(2), (4) Date: Oct. 31, 2005

(87) PCT Pub. No.: WO2004/099315

PCT Pub. Date: Nov. 18, 2004

(65) Prior Publication Data

US 2007/0027247 A1    Feb. 1, 2007

(51) Int. Cl.
*C08K 3/34* (2006.01)

(52) U.S. Cl. .................. 524/442; 524/599

(58) Field of Classification Search .................. 524/442, 524/599
See application file for complete search history.

(56) References Cited

U.S. PATENT DOCUMENTS 5,134,171 A    7/1992    Hammel et al.

FOREIGN PATENT DOCUMENTS

| | | |
|---|---|---|
| EP | 0507554 | 10/1992 |
| EP | 0937743 | 8/1999 |
| EP | 0989159 | 3/2000 |
| JP | 9-169893 | 6/1997 |
| JP | 2000-044716 | 2/2000 |
| JP | 2001-098104 | 4/2001 |
| JP | 2001-164097 | 6/2001 |
| JP | 2002-003709 | 1/2002 |
| JP | 2002363393 | 12/2002 |
| JP | 2003-082212 | 3/2003 |
| JP | 2003-128901 | 5/2003 |
| WO | 9906456 | 2/1999 |

*Primary Examiner*—Kriellion A Sanders
(74) *Attorney, Agent, or Firm*—Fildes & Outland, P.C.

(57) ABSTRACT

It is intended to provide a biodegradable polyester resin composition which is excellent in gas barrier properties, mechanical strength and heat resistance and has Theological characteristics advantageously usable in molding a foamed article, etc., a process for producing the same, and a foamed article and a molded article using the same. The biodegradable polyester resin composition contains 100 parts by mass of a biodegradable polyester resin containing 59% mole or more of a hydroxycarboxylic acid unit, 0.01 to 10 parts by mass of a (meth)acrylic acid ester compound and 0.05 to 20 parts by mass of a layered silicate.

10 Claims, 2 Drawing Sheets

BIODEGRADABLE POLYESTER RESIN COMPOSITION, PROCESS FOR PRODUCING THE SAME AND FOAMED ARTICLE AND MOLDED ARTICLE USING THE SAME

TECHNICAL FIELD

The present invention relates to a biodegradable polyester resin composition excellent in mechanical strength and heat resistance, causing no trouble in operation, having rheological characteristics advantageously usable in molding of a foamed article or a molded article, and excellent in gas barrier properties, and a process for producing the same and a foamed article and a molded article using the same.

BACKGROUND ART

Polylactic acid has a feature that it has a higher melting point and is superior in heat resistance compared to other biodegradable resins. However, since polylactic acid has a low melt viscosity, there are problems, for example, that a sufficient expansion ratio cannot be achieved because bubbles are broken upon extrusion foaming and that the thickness of molded articles tends to be uneven because bubbles are not stable in inflation molding or blow molding. Thus, molding conditions are severely restricted. Further, due to its low crystallization rate, polylactic acid has a disadvantage of low production efficiency in injection molding and the like. Therefore, for practical use, it is necessary to improve the melt viscosity, make effective the strain hardening property when measuring elongational viscosity, and to improve the crystallization rate.

Generally, to impart strain hardening properties to a resin composition, a method of adding a polymer of a high polymerization degree or a method of using a polymer containing a long branched chain is considered to be effective. However, in the production of a polymer of a high polymerization degree, polymerization takes a long time, and not only production efficiency is lowered but also coloring or decomposition due to long thermal history is found. For this reason, biodegradable polyester having a weight average molecular weight of, for example, 500,000 or higher, has not been practically used. On the other hand, as the method of producing polylactic acid containing a long branched chain, a method comprising adding a polyfunctional initiator for polymerization is known (JP-A-10-7778, JP-A-2000-136256). However, introduction of branched chain during polymerization involves a problem that discharge of resin is difficult and the degree of branching cannot be arbitrarily modified. Further, methods comprising melt-kneading a layered silicate have also been studied. JP-A-2001-89646 discloses that a resin with a high rigidity and an increased biodegradation rate can be obtained by melt-kneading with a resin a layered clay mineral that has been organized and made to have an average particle size of not more than 1 µm. However, the publication does not contain concrete description of how to adjust the average particle size of the layered clay mineral to not more than 1 µm, and it completely lacks description of molding conditions, and thus whether the moldability was improved or not is unknown.

On the other hand, a method comprising preparing a biodegradable resin and then melt-kneading the same with a peroxide or a reactive compound to be crosslinked, thereby yielding a strain hardening property. This method is variously studied because it is simple and branching can be arbitrarily modified. However, acid anhydride and polycarboxylic acid used in JP-A-11-60928 are not practical because the reactivity tends to be unstable and the pressure must be reduced. In addition, in the case of polyisocyanate used in JP-B-2571329 and JP-A-2000-17037, its molecular weight tends to be decreased upon melting and this causes safety problems in operation. Thus, technology satisfying practical requirements has not yet been established.

JP-A-10-324766 discloses that foaming can be effectively performed when a biodegradable polyester resin synthesized from dibasic acid and glycol is combined and crosslinked with an organic peroxide and a compound containing an unsaturated bond. This method is an example of immersing these crosslinking agents to resin fine particles at a temperature lower than the melting point of the resin, and the case in which divinylbenzene is used as a coagent is described in detail. However, use of (meth)acrylic acid ester compound is not studied, and only application to a biodegradable polyester resin synthesized from dibasic acid and glycol having a low heat resistance has been studied. Further, regarding addition of these crosslinking agent and coagent, no technique for stable and long term operation has been suggested.

A biodegradable polyester with improved heat resistance composed mainly of α- and/or β-hydroxycarboxylic acid unit is also known. However, this biodegradable polyester has a low crystallization rate and is poor in operation ability in molding such as injection molding. To solve this problem, a method of adding inorganic powder has been suggested, but it is not satisfactory.

In addition, gas barrier properties, in particular oxygen barrier property of biodegradable polyester is insufficient, and it was impossible to use biodegradable polyester for applications requiring gas barrier properties, such as food containers. To improve gas barrier properties, a method of dispersing a layered silicate in a resin has been proposed. It is considered that the gas barrier property is improved because permeation of the gas component is blocked by the layered silicate in the resin and the gas moves around the layered silicate. For example, usefulness of layered silicate in polyamide resin is disclosed in JP-B-3284552 and application of layered silicate to aliphatic polyester is disclosed in JP-A-2001-164097. However, rheological characteristics suitable for various molding processes cannot be achieved only by mixing a layered silicate to a resin, and there is a problem of poor operation ability.

The present invention solves the above described problems and provides a biodegradable polyester resin composition excellent in mechanical strength and heat resistance, having a high crystallization rate, causing no trouble in operation, having rheological characteristics advantageously usable in molding of a foamed article or a molded article, and excellent in gas barrier properties, and a process for producing the same and a foamed article and a molded article using the same.

DISCLOSURE OF THE INVENTION

The present inventors have conducted intensive studies and as a result completed the present invention. Accordingly, the present invention relates to a biodegradable polyester resin composition comprising 100 parts by mass of a biodegradable polyester resin containing not less than 50% by mole of an α- and/or β-hydroxycarboxylic acid unit, 0.01 to 10 parts by mass of a (meth)acrylic acid ester compound and 0.05 to 20 parts by mass of a layered silicate.

The present invention also relates to a process for producing a biodegradable polyester resin composition which comprises melt-kneading a biodegradable polyester resin with a layered silicate and then adding a (meth)acrylic acid ester compound and a peroxide thereto, or pouring a solution or a dispersion of a (meth)acrylic acid ester compound, or a solution or a dispersion of a (meth)acrylic acid ester compound and a peroxide, followed by melt-kneading.

The present invention also relates a biodegradable resin foamed article obtained by foam molding of a biodegradable polyester resin composition of the present invention.

The present invention also relates a biodegradable resin molded article obtained by any of injection molding, extrusion molding and blow molding of a biodegradable polyester resin composition of the present invention.

BEST MODE FOR CARRYING OUT THE INVENTION

The biodegradable polyester resin composition of the present invention is essentially a specific compound containing a biodegradable polyester resin, a (meth)acrylic acid ester compound and a layered silicate. By mixing a (meth)acrylic acid ester compound with a biodegradable polyester resin excellent in heat resistance, the crystallization rate becomes higher and the moldability is improved.

However, by simply mixing a (meth)acrylic acid ester compound, the rigidity at higher temperature is low and sufficient operationability cannot be obtained. Thus, in the present invention, by mixing a layered silicate in addition to a (meth)acrylic acid ester compound, a resin composition can be produced, whose rigidity at higher temperature has been improved by further increasing the melt viscosity and exerting the strain hardening property in an elongational viscosity measurement, and which is excellent in operationability and has rheological characteristics advantageously usable in molding of a foamed article. Further, by mixing a layered silicate, heat resistance can be further improved and mechanical properties and dimensional stability can be further improved, and in addition, gas barrier properties, in particular, oxygen barrier properties, are improved.

The biodegradable polyester resin composition of the present invention configured as above has a high melt viscosity, is excellent in strain hardening property when measuring elongational viscosity and has a high crystallization rate. However, these advantages cannot be obtained only by mixing a biodegradable polyester resin, a (meth)acrylic acid ester compound and a layered silicate. In the present invention, problems in operation can be solved by producing the biodegradable polyester resin composition configured as above by the production process of the present invention, and the obtained molded article is excellent in heat resistance and mechanical strength and has good appearance.

The present invention will now be described in detail below.

The biodegradable polyester resin composition of the present invention needs to contain 100 parts by mass of a biodegradable polyester resin containing not less than 50% by mole of an α- and/or β-hydroxycarboxylic acid unit, 0.01 to 10 parts by mass of a (meth)acrylic acid ester compound and 0.05 to 20 parts by mass of a layered silicate.

The biodegradable polyester resin which is the main component needs to contain not less than 50% by mole of an α- and/or β-hydroxycarboxylic acid unit. When the content of the α- and/or β-hydroxycarboxylic acid unit is less than 50% by mole, biodegradability and heat resistance are decreased.

Examples of α- and/or β-hydroxycarboxylic acid units include D-lactic acid,-L-lactic acid or a mixture thereof, glycolic acid, 3-hydroxybutyric acid, 3-hydroxyvaleric acid and 3-hydroxycaproic acid. In particular, biodegradable polyester resins containing D-lactic acid, L-lactic acid or a mixture thereof are preferred because they are excellent in mechanical strength and heat resistance. In the present invention, the resin composition preferably contains not less than 50% by mole of polylactic acid, polyglycolic acid, poly(3-hydroxybutyric acid), poly(3-hydroxyvaleric acid), poly(3-hydroxycaproicacid), or a copolymer or mixture thereof.

The biodegradable polyester resin in the present invention may be produced by generally known melt polymerization or by further using solid state polymerization together. Poly(3-hydroxybutyric acid), poly(3-hydroxyvaleric acid) and the like may also be produced using a microorganism.

In the biodegradable polyester resin in the present invention, another biodegradable resin may be copolymerized or mixed therewith if necessary within the limit that the heat resistance of poly(α- and/or β-hydroxycarboxylic acid) is not significantly damaged. Examples of other biodegradable resins include aliphatic polyesters composed of diol and dicarboxylic acid which are typically poly(ethylene succinate) and poly(butylene succinate), poly(ω-hydroxyalkanoates) which are typically poly(ε-caprolactone), (butylene succinate-butylene terephthalate)copolymers and (butylene adipate-butylene terephthalate)copolymers which are biodegradable despite that they contain an aromatic component, polyester amides, polyester carbonates and polysaccharides such as starch.

Though the molecular weight of the biodegradable polyester resin in the present invention is not particular limited, the resin has a weight average molecular weight of preferably 50,000 to 1,000,000, more preferably 100,000 to 1,000,000. A weight average molecular weight of less than 50,000 is not preferable because the melt viscosity of the resin composition becomes too low. A weight average molecular weight of more than 1,000,000 is not preferable because moldability of the resin composition is suddenly reduced.

As the (meth)acrylic acid ester compound in the present invention, compounds containing at least two (meth)acrylic groups or at least one (meth)acrylic group and at least one glycidyl group or vinyl group are preferred, because they are highly reactive to the biodegradable resin and thus monomer hardly remains, and they are relatively less toxic and cause little coloring of the resin. Specific examples of such compounds include glycidyl methacrylate, glycidyl acrylate, glycerol dimethacrylate, trimethylolpropane trimethacrylate, trimethylolpropane triacrylate, allyloxypolyethylene glycol monoacrylate, allyloxypolyethylene glycol monomethacrylate, polyethylene glycol dimethacrylate, polyethylene glycol diacrylate, polypropylene glycol dimethacrylate, polypropylene glycol diacrylate and polytetramethylene glycol dimethacrylate. Additional examples thereof include copolymers thereof containing various lengths of those alkylene glycol moieties, butanediol methacrylate and butanediol acrylate.

The mixing ratio of the (meth)acrylic acid ester compound in the present invention needs to be 0.01 to 10 parts by mass, preferably 0.05 to 5 parts by mass based on 100 parts by mass of the biodegradable polyester resin. When the mixing ratio of the (meth)acrylic acid ester compound is less than 0.01 parts by mass, the effect of improving mechanical strength, heat resistance and dimensional stability which is an object of the present invention cannot be obtained. When the mixing ratio of the (meth)acrylic acid ester compound is more than 10 parts by mass, the crosslinking degree is too high and the operation ability is poor.

In the present invention, concurrent use of peroxide when mixing the (meth)acrylic acid ester compound with the biodegradable polyester resin is preferable because the crosslinking reaction is accelerated and the strain hardening property is easily exerted. Examples of peroxides include benzoyl peroxide, bis(butylperoxy)trimethylcyclohexane, bis(butylperoxy)cyclododecane, butylbis(butylperoxy)valerate, dicumyl peroxide, butylperoxybenzoate, dibutyl peroxide, bis(butylperoxy)diisopropylbenzene, dimethyldi(butylperoxy)hexane, dimethyldi(butylperoxy) hexyne and butylperoxycumene.

The mixing ratio of peroxide is preferably 0.02 to 20 parts by mass, more preferably 0.05 to 10 parts by mass based on 100 parts by mass of the biodegradable polyester resin. The peroxide may be mixed at a mixing ratio of more than 20 parts by mass, but it is disadvantageous in terms of the cost. Since peroxide decomposes when mixed with the resin, the obtained resin composition may not contain peroxide even if it is used when mixing.

The mixing ratio of the layered silicate in the present invention needs to be 0.05 to 20 parts by mass, preferably 0.1 to 10 parts by mass based on 100 parts by mass of the biodegradable polyester resin. When the mixing ratio of the layered silicate is less than 0.05 parts by mass, sufficient mechanical strength and heat resistance cannot be obtained. When the mixing ratio is more than 20 parts by mass, the obtained composition may be brittle and there is disadvantage in terms of the cost. In addition, although gas barrier properties are improved by mixing the layered silicate, this advantage is substantially the same even if more than 20 parts by mass of the layered silicate is mixed.

Specific examples of layered silicate include smectite, vermiculite and swellable fluoromica. Examples of smectites include montmorillonite, beidellite, hectorite and saponite. Examples of swellable fluoromicas include Na-type tetrasilisic fluoromica, Na taeniolite and Li taeniolite. In addition to those described above, layered silicates containing no aluminum or magnesium such as kanemite, makatite, magadiite and kenyte may also be used. Of these, layered silicates having a high aspect ratio, such as montmorillonite and swellable fluoromica, are preferred, and swellable fluoromica is particularly preferred, in order to improve gas barrier properties. Further, the layered silicate may be a natural product or a synthetic product. The method of producing synthetic layered silicate may be any of fusion, intercalation, hydrothermal synthesis, etc. These layered silicates may be used alone or in a combination of two or more of minerals with different kinds, origins, production methods, particle sizes, etc.

It is preferable that the layered silicate in the present invention is previously treated by an organic cation. Examples of organic cations include ammonium ions generated by protonation of primary to tertiary amines, quaternary ammonium ions and onium ions such as phosphonium ion. Examples of primary amines include octylamine, dodecylamine and octadecylamine. Examples of secondary amines include dioctylamine, methyloctadecylamine and dioctadecylamine. Examples of tertiary amines include trioctylamine, dimethyldodecylamine and didodecylmonomethylamine. Examples of quaternary ammonium ions include tetraethylammonium, octadecyltrimethylammonium, dimethyldioctadecylammonium, dihydroxyethylmethyloctadecylammonium, methyldodecylbis (polyethylene glycol)ammonium and methyldiethyl(polypropylene glycol)ammonium. Examples of phosphonium ions include tetraethylphosphonium, tetrabutylphosphonium, hexadecyltributylphosphonium, tetrakis (hydroxymethyl)phosphonium and 2-hydroxyethyltriphenylphosphonium. Of these, dihydroxylethylmethyloctadecylammonium, methyldodecylbis (polyethylene glycol)ammonium, methyldiethyl(polypropylene glycol) ammonium and onium ions having 1 or more hydroxyl groups in the molecule such as 2-hydroxyethyltriphenylphosphonium are particularly preferred because layered silicates treated with these have high compatibility with polyester resin, especially biodegradable polyester resin and because the dispersibility of such layered silicates is increased. These organic cations may be used alone or in combination of two or more kinds.

Examples of methods of treating layered silicate with the above-described organic cation include a method comprising dispersing a layered silicate in water or alcohol, then adding a salt of the above-described organic cation followed by mixing with stirring, thereby performing ion exchange of the inorganic ion of the layered silicate with the organic cation, then filtrating, washing and drying.

A compatibilizer may also be used with layered silicate so as to improve dispersibility in polyester resin. The compatibilizer is added in an amount of preferably 0.01 to 10 parts by mass, more preferably 0.02 to 5 parts by mass based on 100 parts by mass of the biodegradable polyester resin. When the mixing ratio of the compatibilizer is more than 10 parts by mass, heat resistance and mechanical strengths of the biodegradable polyester resin composition may be decreased. As the compatibilizer, compounds compatible with both polyester resin, especially biodegradable polyester resin, and layered silicate, such as polyalkylene oxides, aliphatic polyesters, polyhydric alcohol esters and polycarboxylic acid esters are used. Examples of polyalkylene oxides include polyethylene glycol, polypropylene glycol, polybutylene glycol and copolymers thereof. At least one of the terminal hydroxyl groups may be blocked by an alkoxy group, or esterified by monocarboxylic acid or dicarboxylic acid. Examples of aliphatic polyesters include polyhydroxycarboxylic acids such as polylactic acid, polyglycolic acid, poly(3-hydroxybutyric acid), poly(3-hydroxyvaleric acid) and poly(3-hydroxycaproic acid), poly(ω-hydroxyalkanoates) which are typically poly(ε-caprolactone) and poly(δ-valerolactone), and aliphatic polyesters composed of diol and dicarboxylic acid which are typically poly(ethylene succinate), poly(butylene succinate) and (butylene succinate-butylene adipate)copolymers. A terminal carboxyl group of these aliphatic polyesters may be esterified by alcohol or substituted by a hydroxyl group of diol. Examples of polyhydric alcohol esters include glycerol esters such as monoglyceride, diglyceride and triglyceride which are esters of glycerol and aliphatic acid, and pentaerythritol esters. Examples of polycarboxylic acid esters include citrates such as tributyl citrate and tributyl citrate acetate.

The above-described compatibilizer preferably has a boiling point of not lower than 250° C. When the boiling point is lower than 250° C., gas may be generated during molding and bleed-out from molded article may occur. The compatibilizer preferably has a number average molecular weight of preferably 200 to 50,000, more preferably 500 to 20,000. When the number average molecular weight is less than 200, gas is easily generated during molding and bleed-out from molded article tends to occur, and the mechanical strength and the heat resistance of the molded article may be decreased. When the number average molecular weight is higher than 50,000, the effect of improving dispersibility of layered silicate tends to decrease.

Examples of methods of adding compatibilizer include a method in which the above-described compound is previously impregnated into layered silicate directly, a method comprising mixing the above-described compound in the presence of water or an organic solvent and then removing water or the organic solvent by filtration or the like, a method of adding a compatibilizer when melt-kneading polyester resin and layered silicate and a method of adding compatibilizer together with layered silicate when synthesizing polyester resin. Preferably used is a method in which a compatibilizer is mixed with layered silicate before mixing with polyester.

Preferred states of dispersion of layered silicate in the biodegradable polyester resin in the present invention include complete exfoliation types in which layered silicate is exfoliated into individual platelets, intercalation types in which resin molecules are inserted in between layers, and combinations of these. In a quantitative view, the average thickness of the single layer or the stacked layers of layered silicate is preferably 1 to 100 nm, more preferably 1 to 50 nm, and further preferably 1 to 20 nm as measured by a transmission electron microscope; or the interlayer distance as measured by X-ray diffraction is preferably not less than 2.5 nm, more preferably not less than 3 nm, further preferably not less than 4 nm, and most preferably no peak attributable to the interlayer distance being observed. Examples of methods of controlling dispersibility of such layered silicate include, in a kneading method, modification of kneading conditions, use of the above-described compatibilizer and introduction of a polar group into the resin. Generally, when layered silicate is added upon polymerization of polyester, dispersibility can be further increased to improve gas barrier properties.

Figure 1:
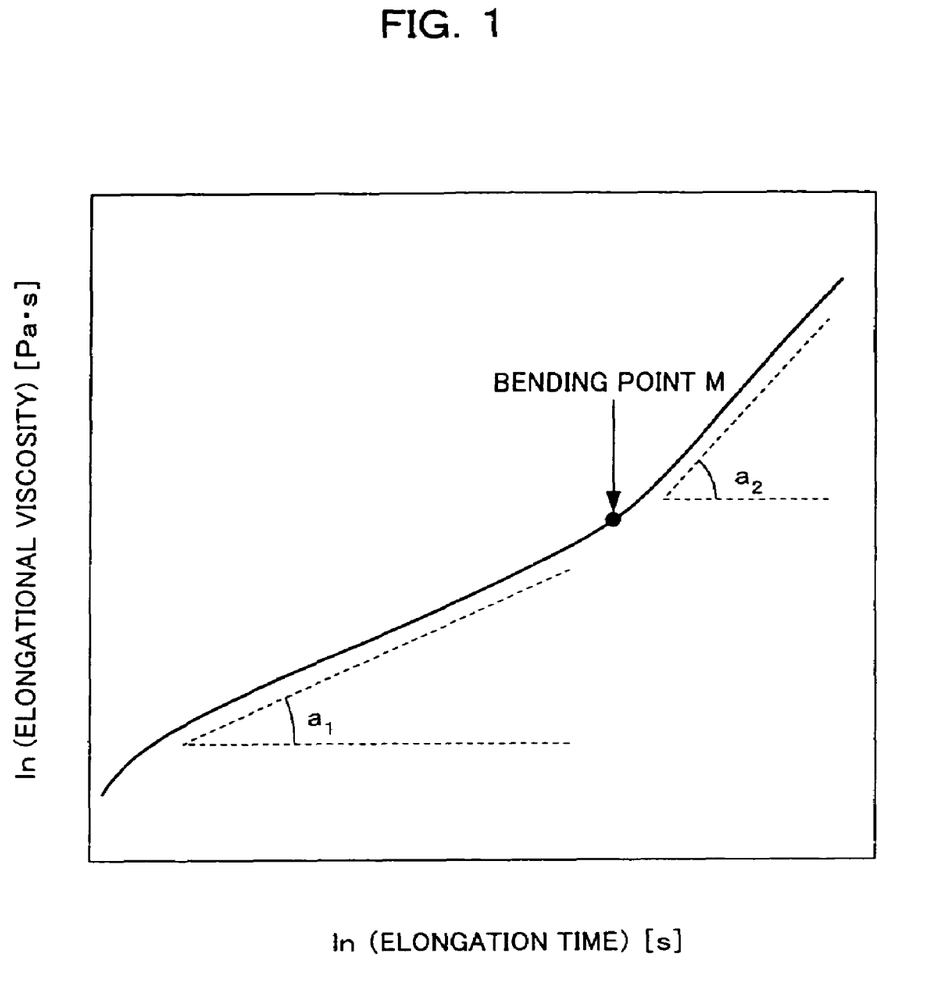
FIG. 1 is a graph illustrating the relationship between elongation time [s] and elongational viscosity [Pa·s] for determining a modulus of strain hardening ($a_2/a_1$). Note that $a_1$, is a gradient in a linear region at an initial stage of elongation before appearance of a bending point M and $a_2$ is a gradient of a later stage of elongation after the bending point M.

The biodegradable polyester resin composition of the present invention has a modulus of strain hardening of preferably not less than 1.05 to not more than 50, more preferably 1.5 to 30. When the modulus of strain hardening is less than 1.05, bubbles are broken upon extrusion foaming, and the thickness of molded articles tends to be uneven. When the modulus of strain hardening is more than 50, gel is easily generated upon molding and flowability is significantly decreased, and so this range is not preferable. As shown in FIG. 1, the modulus of strain hardening refers to the ratio $(a_2/a_1)$ of a gradient $a_1$, in a linear region at an initial stage of elongation before appearance of a bending point M to a gradient $a_2$ of a later stage of elongation after the bending point M in a logarithmic plot of time-elongational viscosity obtained by measuring elongational viscosities at a temperature 10° C. higher than the melting point.

Figure 2:
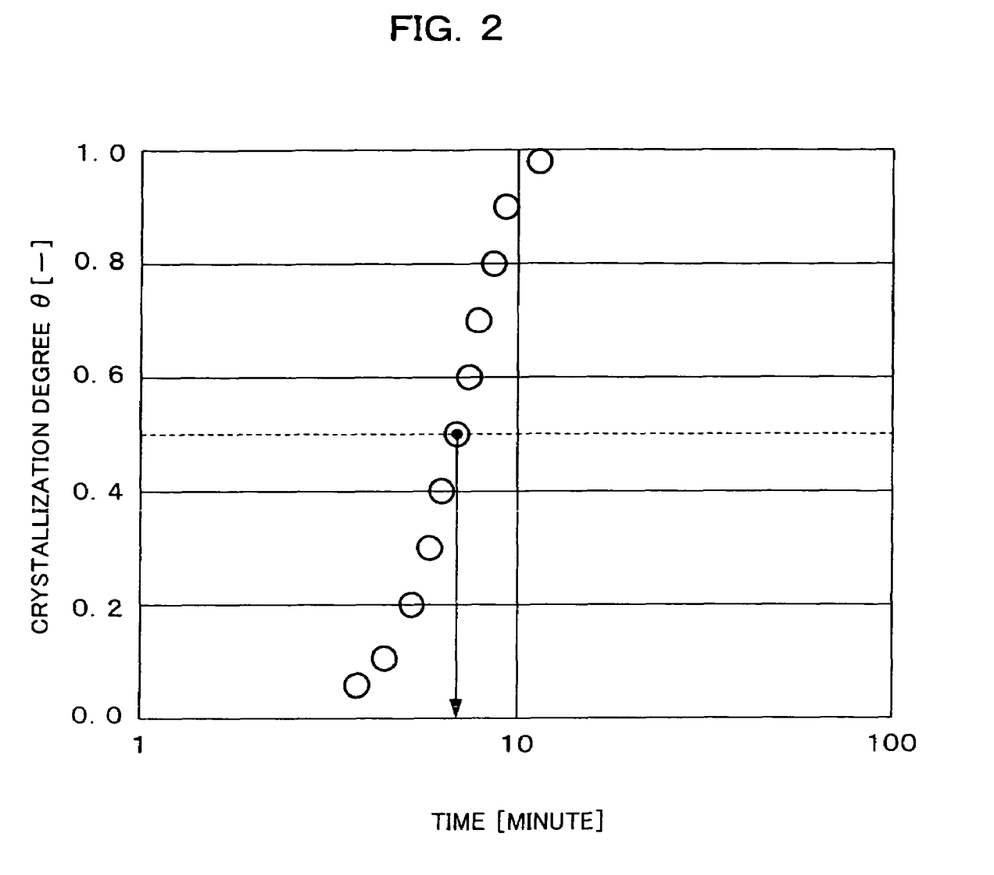
FIG. 2 is a graph illustrating the relationship between crystallization degree (θ) and time (minutes) for determining a crystallization rate index. The crystallization rate index represents the time for reaching the half of the crystallization degree finally reached.

The biodegradable polyester resin composition of the present invention has a crystallization rate index of preferably not more than 30 (minutes). The smaller the crystallization rate index, the higher the crystallization rate, and the larger the crystallization rate index, the lower the crystallization rate. As shown in FIG. 2, the crystallization rate index is the time (minutes) for reaching the half of the crystallization degree (θ) finally reached when a resin is once melted at 200° C. using a DSC instrument and crystallized isothermally at 130° C. When the crystallization rate index is higher than 30 (minutes), crystallization takes too long, molded articles of desired shapes cannot be obtained and the cycle time in injection molding is prolonged to reduce productivity. Further, because too high a crystallization rate reduces moldability, the lower limit of the crystallization rate index is preferably about 0.1 (minutes). The larger the amount of crosslinking agent and/or peroxide, the smaller the crystallization rate index, the higher the crystallization rate can be. The crystallization rate is further increased by adding 0.05 part by mass or more of layered silicate. When 0.1 to 5% by mass of inorganic powder such as talc or calcium carbonate is added, the crystallization rate is further increased by the synergistic effect. The greater the number of functional groups of the crosslinking agent, the higher the crystallization rate.

The biodegradable polyester resin composition of the present invention may be produced by mixing a biodegradable polyester resin, a (meth)acrylic acid ester compound and a layered silicate at a mixing ratio defined in the present invention, and melt-kneading the same using a general extruder. However, it is difficult to promote a crosslinking reaction and achieve strain hardening property by simple melt-kneading of these. Thus, when producing a biodegradable polyester resin composition in the present invention, peroxide is used, or a solution or a dispersion of a (meth)acrylic acid ester compound is used, and at the same time, a biodegradable polyester resin and a layered silicate are previously melt-kneaded.

The approach will be described in detail below.

In the method of producing a biodegradable polyester resin composition of the present invention, first a biodegradable polyester resin and a layered silicate are introduced into an inlet of a kneader by dry-blending or using a volumetric feeder or the like and kneaded.

Then, a (meth)acrylic acid ester compound is introduced from the middle of the kneader to melt-knead the materials, and at this time, peroxide is preferably used together. Peroxide is supplied using a powder feeder when it is solid or by a pressure pump when it is liquid. Alternatively, a solution or a dispersion of a (meth)acrylic acid ester compound may be poured.

In the present invention, it is desirable to dissolve or disperse the (meth)acrylic acid ester compound and/or peroxide in a medium and pour it into the kneader because operation ability is significantly improved. Specifically, it is preferable that a solution or a dispersion of the (meth)acrylic acid ester compound is poured thereinto when melt-kneading the biodegradable polyester resin and the peroxide, or a solution or a dispersion of the (meth)acrylic acid ester compound and the peroxide is poured and melt-kneaded when melt-kneading the biodegradable polyester resin.

As the medium for dissolving or dispersing the (meth)acrylic acid ester compound and/or peroxide, a usual medium may be used without any limitation, and plasticizers excellent in compatibility with the aliphatic polyester in the present invention are preferred, and those biodegradable are preferred. The medium may be, for example, at least one plasticizer selected from aliphatic polycarboxylic acid ester derivatives, aliphatic polyhydric alcohol ester derivatives, aliphatic oxyester derivatives, aliphatic polyether derivatives and aliphatic polyether polycarboxylic acid ester derivatives. Specific examples of such compound include dimethyl adipate, dibutyl adipate, triethylene glycol diacetate, methyl acetyl ricinoleate, tributyl acetylcitrate, polyethylene glycol and dibutyl diglycol succinate. The plasticizer is used in an amount of preferably not more than 30 parts by mass, more preferably 0.1 to 20 parts by mass based on 100 parts by mass of the resin. The plasticizer need not be used when the crosslinking agent has low reactivity, but when it has high reactivity, 0.1 part by mass or more of a plasticizer is preferably used. The (meth)acrylic acid ester compound and the peroxide may be added separately.

For a better kneading condition, a twin screw extruder may be used. The kneading temperature is in the range of preferably (melting point of resin +5C.) to (melting point of resin +100° C.), and the kneading time is preferably 20 seconds to 30 minutes. When the temperature and the time are below the range, kneading and reaction are insufficient. When the temperature and the time are above the range, the resin may be decomposed or colored.

The biodegradable polyester resin composition of the present invention may be produced by melt-kneading a biodegradable polyester resin, a (meth)acrylic acid ester compound, a peroxide and a layered silicate as raw materials as described above. Because peroxide is generally decomposed during melt-kneading, the obtained resin composition does not necessarily contain peroxide. In addition, a medium such as plasticizer is preferably used upon addition of a (meth) acrylic acid ester compound and/or peroxide, but this medium may also evaporate upon melt-kneading, and thus the obtained resin composition does not necessarily contain the medium.

Various additives such as pigments, heat stabilizers, antioxidants, weathering agents, flame retardants, plasticizers, lubricants, release agents, antistatic agents and fillers may be added to the biodegradable polyester resin composition of the present invention according to need within the range in which the properties of the composition are not significantly damaged. As such heat stabilizer and antioxidant, hindered phenol, a phosphorus compound, hindered amine, a sulfur compound, a copper compound, halogenated alkali metal or a mixture thereof may be used. Examples of inorganic fillers include talc, calcium carbonate, zinc carbonate, wallastonite, silica, alumina, magnesium oxide, calcium silicate, sodium aluminate, calcium aluminate, sodium aluminosilicate, magnesium silicate, glass balloon, carbon black, zinc oxide, antimony trioxide, zeolite, hydrotalcite, metal fiber, metal whisker, ceramic whisker, potassium titanate, boron nitride, graphite, glass fiber and carbon fiber. Examples of organic fillers include naturally occurring polymers such as starch, cellulose fine particles, wood flour, bean curd refuse, husk and bran, and modified products of these.

The method of adding the above-described additive or another thermoplastic resin to the biodegradable polyester resin composition of the present invention is not particularly limited. For example, after usual melting by heating, materials may be kneaded by a conventionally known kneading method using a single screw extruder, a twin screw extruder, a roll mill or a Brabender mixer. In addition, using a static mixer or a dynamic mixer together is also effective. The above-described additive or another thermoplastic resin may be added upon polymerization of the biodegradable resin.

As the method of foaming for producing a foamed article from the biodegradable polyester resin composition of the present invention, any of the general methods may be used. For example, a decomposition-type foaming agent that decomposes at the melting temperature of the resin is previously added to the resin using an extruder, and the resultant is extruded from a slit nozzle in the form of a sheet, or from a circular nozzle in the form of a strand. Examples of decomposition-type foaming agents include azo compounds which are typically azodicarbonamide and barium azodicarboxylate, nitroso compounds which are typically N,N'-dinitrosopentamethylenetetramine, hydrazine compounds which are typically 4,4'-oxybis(benzenesulfonylhydrazide) and hydrazo-dicarbonamide and inorganic foaming agents such as sodium hydrogen carbonate. Foaming may also be performed by pouring a volatile foaming agent from the middle of the extruder. Examples of foaming agents in this case include inorganic compounds such as nitrogen, carbon dioxide and water, hydrocarbons such as methane, ethane and butane, fluorocarbon compounds and organic solvents which are typically alcohols such as ethanol and methanol. A method may also be used comprising previously preparing fine particles of a resin composition, impregnating the above-described foaming agent into an organic solvent or water, and then foaming by changing temperature or pressure, thereby preparing foamed fine particles. Specific uses of the biodegradable foam sheets or foam plates prepared by extrusion foaming include decorative sheets or various boards as they are, or they may be bended to be used as lunch boxes, decoration boxes or buffer materials, or subjected to drawing and used as food containers, trays, cups, gardening pots, interior materials of automobiles, mannequins and toys. Foamed particles may be used as various buffer materials after molding, or directly as cushion materials.

Biodegradable foam sheets and foam plates prepared by extrusion foaming may be subjected to deep draw forming such as vacuum forming, air-pressure forming or vacuum air-pressure forming to produce food containers, farming and gardening containers, blister pack containers and press-through packages. The temperature for deep draw forming and heat treatment is preferably (Tg+20° C.) to (Tm−20° C.). When the deep draw forming temperature is lower than (Tg+20° C.), deep drawing may be difficult and heat resistance of the obtained container may be insufficient. When the deep draw forming temperature is higher than (Tm−20° C.), the thickness of molded articles tends to be uneven or the impact resistance thereof may be decreased due to disordered orientation.

The method of extrusion molding for producing an extrusion molded article from the biodegradable polyester resin composition of the present invention will now be described. For extrusion molding, a T-die method or a cylindrical die method may be employed. The extrusion molding temperature needs to be not lower than the melting point (Tm) or the flow initiation temperature of the biodegradable polyester resin composition, and is in the range of preferably 180 to 230° C., more preferably 190 to 220° C. When the molding temperature is too low, molding may be unstable and overload may be easily caused. When the molding temperature is too high, the biodegradable polyester resin may be decomposed and cause problems that the strength of the obtained extrusion molded article is decreased and that the molded article is colored, for example. While biodegradable sheets or pipes may be produced by extrusion molding, in order to improve their heat resistance, heat treatment may be performed at not lower than the glass transition temperature (Tg) of the biodegradable polyester resin composition to not higher than (Tm−20° C.).

Specific uses of the biodegradable sheets or pipes produced by extrusion molding include a master sheet for deep draw molding, a master sheet for batch foaming, cards such as credit cards, plastic boards, plastic folders, drinking straws and farming and gardening hard pipes. Further, biodegradable sheets may be subjected to deep draw forming such as vacuum forming, air-pressure forming or vacuum air-pressure forming to produce food containers, farming and gardening containers, blister pack containers and press-through packages. The temperature for deep draw forming and heat treatment is preferably (Tg+20° C.) to (Tm−20° C.). When the deep draw forming temperature is lower than (Tg+20° C.), deep drawing may be difficult and heat resistance of the obtained container maybe insufficient. When the deep draw forming temperature is higher than (Tm−20° C.), the thickness of molded articles tends to be uneven or the impact resistance thereof may be decreased due to disordered orientation.

The form of food containers, farming and gardening containers, blister pack containers and press-through packages is not particularly limited, but for storing food, goods and medicines, the material is deep-drawn to a depth of preferably not less than 2 mm. The thickness of the container is not particularly limited, but in view of the strength of the container, the container has a thickness of preferably not less than 50 μm, more preferably 150 to 500 μm. Specific examples of food containers include fresh food trays, instant food containers, fast food containers and lunch boxes. Specific examples of farming and gardening containers include seedling pots. Examples of blister pack containers include packaging containers of various products other than food such as office supplies, toys and dry cells.

The method of blow molding for producing a blow-molded article from the biodegradable polyester resin composition of the present invention will now be described. For blow molding, direct blowing in which raw material chips are directly molded, injection blow molding in which a preform (closed-end parison) is formed by injection molding followed by blow molding, stretch blow molding, or the like may be employed. Alternatively, either of a hot parison method in which blow molding is continuously performed after forming a prefoam and a cold parison method in which a prefoam is once cooled, taken out and then heated again to perform blow molding may be employed. The blow molding temperature needs to be (Tg+20° C.) to (Tm−20° C.) When the blow molding temperature is lower than (Tg+20° C.), molding may be difficult and heat resistance of the obtained container may be insufficient. When the blow molding temperature is higher than (Tm−20° C.), problems may arise that the thickness of molded articles tends to be uneven and blowdown occurs due to decrease in the viscosity, for example, and therefore this temperature range is not preferable.

Regarding the method of injection molding for producing an injection molded article from the biodegradable polyester resin composition of the present invention, a general injection molding method may be used. Gas injection molding, injection press molding, or the like may also be used. The cylinder temperature in injection molding needs to be not lower than Tm or the flow initiation temperature, and is in the range of preferably 180 to 230° C., more preferably 190 to 220° C. When the molding temperature is too low, molding may be unstable because of occurrence of short shot, and overload may be easily caused. When the molding temperature is too high, the biodegradable polyester resin may be decomposed and cause problems that the strength of the obtained extrusion molded article is decreased and that the molded article is colored, for example, and therefore this temperature range is not preferable. On the other hand, the mold temperature needs to be not higher than (Tm−20° C.) . When crystallization is advanced within the mold in order to improve the heat resistance of the biodegradable polyester resin, the composition is preferably kept at (Tg+20° C.) to (Tm−20° C.) for a predetermined time and cooled to the Tg or lower. On the other hand, in the case of post crystallization, the composition is preferably directly cooled to the Tg or lower, and then heat treated again at the Tg to (Tm−20° C.).

In the case of injection molding of a foamed article, a resin and a foaming agent may be previously kneaded, or a foaming agent may be introduced from the middle of the extruder to perform molding. In such case, a general molding method may be applied.

The form of injection molded articles produced by the above-described injection molding is not particularly limited, and specific examples thereof include tableware such as dishes, bowls, pots, chopsticks, spoons, forks and knives, liquid containers, container caps, office supplies such as rulers, pens and pencils, plastic folders and CD cases, commodities such as sink strainers, garbage cans, basins, toothbrushes, combs and hangers, farming and gardening materials such as flowerpots and seedling pots, various toys such as plastic models, resin components for electric appliances such as air conditioner panels, refrigerator trays and various cases, and resin components for automobiles such as bumpers, instrument panels and door trims. The form of the liquid container is not limited, but in order to hold liquid, the composition may be molded so that the container has a depth of preferably not less than 20 mm. The thickness of the container is not particularly limited, but in view of the strength of the container, the container has a thickness of preferably not less than 0.1 mm, more preferably 0.1 to 5mm. Specific examples of liquid containers include beverage cups and bottles for milk products, soft drinks and liquors, temporary storage containers of seasonings such as soy source, sauce, mayonnaise, ketchup and cooking oil, containers of shampoo and conditioner, containers of cosmetics and containers of agricultural chemicals.

EXAMPLE

The present invention will now be described in detail based on Examples, but the present invention is not limited to these Examples. The measurement methods of property values in Examples and Comparative Examples are as follows.

(1) Molecular weight (−): Measured using a gel permeation chromatography (GPC) instrument equipped with a differential refractometer (made by Shimadzu Corporation) eluting with tetrahydrofuran at 40° C. and calculated based on standard polystyrene.

(2) Flexural modulus (GPa): In accordance with the method described in ASTM-790, a test piece of 150 mm×10 mm×3 mm was prepared and load was applied at a deformation rate of 1 mm/minute to measure the flexural modulus.

(3) Melting point (° C.) : Measured using a differential scanning calorimeter DSC-7 (made by Perkin Elmer Inc.) at a temperature increase rate of 10° C./minute, and the temperature at which a melting endothermic curve has the extreme value is defined as the melting point.

(4) MFR (g/10 minutes): Measured in accordance with the method described in JIS K7210 under the condition described in Attachment A, Table 1-D.

(5) Elongational viscosity (−): A test piece of 60 mm×7 mm×1 mm (thickness) was prepared, and using an elongational viscosity measuring instrument RME (made by Rheometric Scientific Inc.), both ends of the test piece were held by a metal belt clamp, and the test piece was rotated at a strain rate of 0.1 sec$^{-1}$ at a temperature 10° C. higher than the melting point of the resin composition to apply elongational deformation thereto, and the torque applied to the pinch roller during deformation was measured to determine the elongational viscosity.

(6) Modulus of strain hardening ($a_2/a_1$): As shown in FIG. 1, the ratio ($a_2/a_1$) of a gradient $a_1$, in a linear region at an initial stage of elongation before appearance of a bending point to a gradient $a_2$ of a later stage of elongation after the bending point was calculated from a double logarithmic plot of elongation time and elongational viscosity. A test piece of 7 mm×60 mm×1 mm (thickness) was used for the measurement. The melting temperature was set to (the melting point of the resin +10° C.).

(7) Crystallization rate index (minutes): Using a DSC instrument (made by Perkin Elmer Inc., Pyrisl DSC), a sample was heated from 20° C. to 200° C. at a temperature increase rate of 500° C./minute and kept at 200° C. for 5 minutes. Then, the temperature was decreased from 200° C. to 130° C. at 500° C./minute and kept at 130° C. to allow crystallization. As shown in FIG. 2, the finally reached crystallization degree is defined as 1 and the time at which the crystallization degree has reached 0.5 was determined to be the crystallization rate index (minutes).

(8) Expansion ratio: The ratio of the density (D1) of a foamed article obtained by dividing the mass of a foamed article by the volume of the foamed article measured by immersing the article in water to the true density of the resin (D0), which is an index of lightweight and cushioning properties.

expansion ratio=$D0/D1$ (9) Appearance of foamed article:
good: uniform sheet, no roughness on the surface
poor: non-uniform sheet, roughness due to broken bubbles found on the surface (10) Molding cycle (second): Index of injection moldability; injection molding was performed using an injection molding machine (made by Toshiba Machine Co., Ltd., IS-100E) under conditions of a molding temperature of 200° C. and a mold temperature of 110° C. to form a release-type cup (diameter 38 mm, height 300 mm), and the cycle time for the cup to be released in good condition was measured.

(11) Blow moldability: Using a blow molding machine (made by NISSEI ASB MACHINE CO., LTD., ASB-50HT), a preform 30 mm in diameter, 100 mm in height and 3.5 mm in thickness was prepared at a molding temperature of 200° C. The obtained preform was heated to a surface temperature of 80° C. and blow-molded into a bottle-shaped mold (90 mm in diameter, 250 mm in height) to prepare a molded article 0.35 mm in thickness. The appearance of the obtained molded article was evaluated as follows.
good: excellent molded article as intended was obtained moderate: could be molded almost as intended, but partially defective
poor: could not be molded as intended (12) Operationability: Operationability for producing a biodegradable polyester resin composition was evaluated as follows.
good: operable for more than an hour without any trouble
poor: serious troubles occurred such as frequent break of strand and stopping of screw (13) Extrusion moldability: The biodegradable polyester resin composition was extruded into a plate and the appearance of the obtained molded article was evaluated as follows.
good: molded article of desired shape without deflection was obtained
moderate: molded article was deflected
poor: molded article of desired shape was not obtained (14) Oxygen permeability coefficient (ml·mm/m²·day·MPa): Resin pellets were press-molded into a sheet of 300 μm in thickness using a pressing machine, and the oxygen permeability coefficient was measured using a differential pressure type gas permeability measurement system (made by GTRTEC Corporation, GTR-30XAU) under conditions of 20° C. and 90% RH. The oxygen permeability coefficient was calculated by the following formula.

oxygen permeability coefficient (ml·mm/m²·day·MPa)
=amount of oxygen permeated (ml/m²·day·MPa)×thickness of sheet (mm)

The oxygen permeability coefficient is an index of gas barrier properties, and the smaller the value, the better the gas barrier properties.

The raw materials and secondary raw materials used in Examples and Comparative Examples are listed below.

(1) Biodegradable Polyester Resin:
A: polylactic acid (weight average molecular weight: 140,000, L-type 99%, D-type 1%, melting point 168° C., MFR 11 g/10minutes)
B: polylactic acid (weight average molecular weight: 200,000, L-type 99%, D-type 1%, melting point 168° C., MFR 3 g/10 minutes)
C: polylactic acid (weight average molecular weight: 150,000, L-type 96%, D-type 4%, melting point 112° C., MFR 10 g/10 minutes)
D: polylactic acid resin (1,4-butanediol/succinic acid/lactic acid copolymer, melting point 110° C., MFR 5 g/10 minutes)
E: polybutylene succinate (melting point 115° C., MFR 30 g/10 minutes)
F: terephthalic acid/adipic acid/1,4-butanediol copolymer, melting point 108° C., MFR 5 g/10 minutes (2) (Meth)acrylic Acid Ester Compound:
I: polyethylene glycol dimethacrylate (hereinafter "PEGDM")(available from NOF Corporation)
II: trimethylpropane trimethacrylate (hereinafter "TMPTM") (available from NOF Corporation)
III: polyethylene glycol diacrylate (hereinafter "PEGDA") (available from NOF Corporation)
IV: glycidylmethacrylate (hereinafter "GM")(available from NOF Corporation)

(3) Layered Silicate:
1. LUCENTITE SAN: swellable hectorite in which an interlayer ion is substituted by a dimethyldioctadecylammonium ion (available from CO-OP Chemical Co., Ltd., average particle size 0.1 μm).
2. LUCENTITE SEN: swellable hectorite in which an interlayer ion is substituted by a dihydroxyethyl methyldodecylammonium ion (available from CO-OP Chemical Co., Ltd., average particle size 0.1 μm).
3. S-BEN E: montmorillonite in which an interlayer ion is substituted by a trimethyloctadecylammonium ion (available from HOJUN Co., Ltd., average particle size 2.5 μm)
4. Somasif MEE: swellable fluoromica in which an interlayer ion is substituted by a dihydroxyethyl methyldodecylammonium ion (available from CO-OP Chemical Co., Ltd., average particle size 6.3 μm)

(4) Peroxide:
1. di-t-butyl peroxide (available from NOF Corporation)
2. 2,5-dimethyl-2,5-bis(t-butylperoxy)hexyne-3 (available from NOF Corporation)
3. powder of 2,5-dimethyl-2,5-bis(t-butylperoxy)hexyne-3 diluted with inert solid (available from NOF Corporation), previously dry-blended to the resin to be used

Examples 1 to 3

100 parts by mass of A: polylactic acid (weight average molecular weight 140,000, L-type 99%, D-type 1%, melting point 168° C., MFR 11 g/10 minutes) which is a biodegradable polyester resin, 4 parts by mass of S-BEN E which is a layered silicate and 1.0 part by mass of fine talc powder which is a nucleating agent (available from Hayashi Kasei Co., Ltd., average particle size 2.5 μm) were dry-blended using a twin-screw kneading extruder (made by Ikegai Corporation, PCM-30, die diameter 4 mm×3 H, kneading temperature 200° C.), and supplied to the extrusion feeder. PEGDM of I which is a (meth)acrylic acid ester compound was used in a proportion shown in Table 1, and a mixed solution of the PEGDM, di-t-butyl peroxide which is liquid peroxide and acetyl tributyl citrate which is a plasticizer was prepared so that the proportion thereof was 1:2:5 parts by mass. The obtained mixed solution was supplied to the middle part of the extruder using a liquid metering pump. The dry-blended resin and the mixed solution described above were melt-kneaded, extruded, pelletized and then dried to give a biodegradable polyester resin composition.

The biodegradable polyester resin composition and carbon dioxide gas having a concentration of 1.0% by mass which is a foaming agent were supplied to a twin screw foaming extruder (made by Ikegai Corporation PCM-30, die lips: 1.2 mm in width×40mm in length) and a foam sheet was prepared under conditions of a kneading temperature of 200° C. and a die temperature of 160° C.

Properties of the resin compositions and the foamed articles obtained are shown in Table 1.

using the biodegradable polyester resin composition had closed cells, a uniform thickness and were excellent in appearance.

Comparative Example 1

No (meth)acrylic acid ester compound was mixed thereto. Except for that, a resin composition was prepared and a foam sheet was produced in the same manner as in Example 1.

Properties of the resin composition and the foamed article obtained are shown in Table 1.

Comparative Example 2

The mixing ratio of the (meth)acrylic acid ester compound was set to 12 parts by mass, which is beyond the range of the present invention. Although it was attempted to prepare a foam sheet in the same manner as in Example 1 except for the above, the resin composition was too viscous to be extruded, and a sheet was not obtained.

In Comparative Example 1, mechanical strengths, typically flexural modulus, were not improved and the obtained composition had a low modulus of strain hardening because no (meth)acrylic acid ester compound was contained. Further, when the resin composition was subjected to foaming, bubbles were broken and the thickness of the foam sheet was uneven.

In Comparative Example 2, the resin composition was too viscous as described above to be steadily extruded and preparation of the resin composition was unsuccessful, because the

TABLE 1

|  |  | Ex. 1 | Ex. 2 | Ex. 3 | Com. Ex. 1 | Com. Ex. 2 |
|---|---|---|---|---|---|---|
| biodegradable polyester resin | kind | A | A | A | A | A |
|  | part(s) by mass | 100 | 100 | 100 | 100 | 100 |
| (meth) acrylic acid ester compound | kind | I | I | I | — | I |
|  | part(s) by mass | 0.10 | 1.0 | 3.0 | — | 12 |
| Layered silicate | kind | 3. | 3. | 3. | 3. | 3. |
|  | part(s) by mass | 4 | 4 | 4 | 4 | 4 |
| operationability |  | good | good | good | good | poor |
| MFR | g/10 minutes | 1.3 | 0.8 | 0.6 | 11.8 | — |
| crystallization rate index | minute | 2 | 1.5 | 0.5 | 32 | — |
| modulus of strain hardening |  | 14 | 18 | 25 | 1.03 | — |
| oxygen permeability coefficient | ml · mm/m$^2$ · day · MPa | 140 | 152 | 140 | 155 | — |
| flexural modulus | GPa | 3.8 | 4.1 | 4.3 | 3.0 | — |
| expansion ratio |  | 5.1 | 8.0 | 10 | — (bubbles broken) | — |
| appearance of foamed article |  | good | good | good | poor | — |
| sheet size: thickness × sheet width | mm × mm | 5 × 42 | 7 × 44 | 8 × 48 | 1 × 40 | — |

In the resulting resin compositions of Examples 1 to 3, the (meth)acrylic acid ester compound and the layered silicate were mixed at a ratio within the range of the present invention, and thus the crystallization rate was high and the operationability was excellent. Further, the obtained biodegradable polyester resin composition had a high modulus of strain hardening and was excellent in flexural modulus. In addition, because the (meth)acrylic acid ester compound was melt-kneaded after mixing the layered silicate with the polyester resin, the obtained resin composition was excellent in operationability and moldability. The foamed articles obtained amount of the (meth)acrylic acid ester compound added was beyond the range of the present invention.

Examples 4 to 13

The kind and the mixing ratio of the biodegradable polyester resin and the (meth)acrylic acid ester compound in Example 1 were changed as described in Tables 2-1 and 2-2. Except for that, a biodegradable polyester resin composition was prepared in the same manner as in Example 1.

The obtained biodegradable polyester resin composition and carbon dioxide gas having a concentration of 1.0% by mass which is a foaming agent were supplied to a twin screw foaming extruder (made by Ikegai Corporation PCM-45, die lips: 0.7 mm in width×65 mm in length) and a foam sheet was prepared under conditions of a kneading temperature of 200° C. and a die temperature of 160° C. Properties of the resin compositions and the foamed articles obtained are shown in Tables 2-1 and 2-2.

Examples 14 to 18

The kind and the mixing ratio of layered silicate are changed as shown in Table 3-1. Except for that, a biodegradable polyester resin composition was prepared in the same manner as in Example 1.

TABLE 2-1

|  |  | Ex. 4 | Ex. 5 | Ex. 6 | Ex. 7 | Ex. 8 |
|---|---|---|---|---|---|---|
| biodegradable polyester resin | kind | A | A | A | B | C |
|  | part(s) by mass | 100 | 100 | 100 | 100 | 100 |
| (meth) acrylic acid ester compound | kind | III | I | IV | I | I |
|  | part(s) by mass | 0.10 | 0.10 | 0.10 | 0.10 | 0.10 |
| Layered silicate | kind | 3. | 3. | 3. | 3. | 3. |
|  | part(s) by mass | 4 | 4 | 4 | 4 | 4 |
| operationability |  | good | good | good | good | Good |
| MFR | g/10 minutes | 1.2 | 1.3 | 0.9 | 1.0 | 1.1 |
| crystallization rate index | minute | 2 | 2 | 1.5 | 4 | 20 |
| modulus of strain hardening |  | 15 | 14 | 17 | 13 | 12 |
| oxygen permeability coefficient | ml · mm/m$^2$ · day · MPa | 160 | 155 | 153 | 140 | 141 |
| flexural modulus | GPa | 4.1 | 4.0 | 4.1 | 4.3 | 4.0 |
| expansion ratio |  | 7.5 | 7.3 | 7.6 | 7.2 | 7.0 |
| appearance of foamed article |  | good | good | good | good | Good |
| sheet size: thickness × sheet width | mm × mm | 5 × 70 | 5 × 68 | 6 × 71 | 5 × 67 | 5 × 65 |

TABLE 2-2

|  |  | Ex. 9 | Ex. 10 | Ex. 11 | Ex. 12 | Ex. 13 |
|---|---|---|---|---|---|---|
| biodegradable polyester resin | kind | A/D | A/E | A/F | A/E | A/F |
|  | part(s) by mass | 80/20 | 50/50 | 20/80 | 80/20 | 80/20 |
| (meth) acrylic acid ester compound | kind | I | I | I | I | I |
|  | part(s) by mass | 0.10 | 0.10 | 0.10 | 0.10 | 0.10 |
| Layered silicate | kind | 3. | 3. | 3. | 3. | 3. |
|  | part(s) by mass | 4 | 4 | 4 | 4 | 4 |
| operationability |  | good | good | good | good | good |
| MFR | g/10 minutes | 1.1 | 0.8 | 0.6 | 0.9 | 0.8 |
| crystallization rate index | minute | 3.2 | 3.6 | 4.0 | 3.2 | 5.5 |
| modulus of strain hardening |  | 8 | 10 | 13 | 5.0 | 4.5 |
| oxygen permeability coefficient | ml · mm/m$^2$ · day · MPa | 160 | 162 | 153 | 153 | 165 |
| flexural modulus | GPa | 3.9 | 3.7 | 3.3 | 3.6 | 3.7 |
| expansion ratio |  | 7.0 | 7.5 | 8.1 | 5.2 | 4.3 |
| appearance of foamed article |  | good | good | good | good | good |
| sheet size: thickness × sheet width | mm × mm | 5 × 66 | 7 × 70 | 8 × 70 | 4 × 67 | 3 × 67 |

In Examples 4 to 6, the kind of (meth)acrylic acid ester compound was changed, and in Examples 7 to 13, the kind of biodegradable polyester resin was changed. Since the mixing ratio of the biodegradable polyester resin, the layered silicate and the (meth)acrylic acid ester compound was within the range of the present invention in all cases, the compositions had a high crystallization rate, a high modulus of strain hardening, and were excellent in flexural modulus, and uniform foamed articles having closed cells were obtained.

The obtained biodegradable polyester resin composition and carbon dioxide gas having a concentration of 1.0% by mass which is a foaming agent were supplied to a twin screw foaming extruder (made by Ikegai Corporation PCM-45, die lips: 0.7 mm in width×65 mm in length) and a foam sheet was prepared under conditions of a kneading temperature of 200° C. and a die temperature of 160° C.

Properties of the resin compositions and the foamed articles obtained are shown in Table 3-1.

TABLE 3-1

|  |  | Ex. 14 | Ex. 15 | Ex. 16 | Ex. 17 | Ex. 18 |
|---|---|---|---|---|---|---|
| biodegradable polyester resin | kind | A | A | A | A | A |
|  | part(s) by mass | 100 | 100 | 100 | 100 | 100 |
| (meth) acrylic acid ester compound | kind | I | I | I | I | I |
|  | part(s) by mass | 0.10 | 0.10 | 0.10 | 0.10 | 0.10 |
| Layered silicate | kind | 1. | 2. | 4. | 4. | 4. |
|  | part(s) by mass | 4 | 4 | 4 | 2 | 8 |
| operationability |  | good | good | good | good | good |
| MFR | g/10 minutes | 0.5 | 1.3 | 0.9 | 1.3 | 0.6 |
| crystallization rate index | minute | 2 | 3 | 0.5 | 3 | 0.5 |
| modulus of strain hardening |  | 1.8 | 2.5 | 18 | 10.2 | 22 |
| flexural modulus | GPa | 4.0 | 4.0 | 4.2 | 3.9 | 4.5 |
| Oxygen permeability coefficient | ml · mm/m$^2$ · day · MPa | 170 | 172 | 85 | 120 | 60 |
| expansion ratio |  | 5.6 | 6.0 | 7.9 | 8.0 | 4.6 |
| Appearance of foamed article |  | good | good | good | good | good |
| sheet size: thickness × sheet width | mm × mm | 4 × 66 | 4 × 68 | 5 × 70 | 5 × 72 | 3 × 67 |

In Examples 14 to 16, the kind of layered silicate was changed, and in Examples 17 and 18, the amount of layered silicate was changed. Since the mixing ratio of the biodegradable polyester resin, the layered silicate and the (meth)acrylic acid ester compound was within the range of the present invention in all cases, the compositions had a high crystallization rate, a high modulus of strain hardening and was excellent in flexural modulus, and uniform foamed articles having closed cells were obtained. Further, as demonstrated in Example 16, when Somasif MEE was used as the layered silicate, gas barrier properties were particularly improved. In addition, as demonstrated in Examples 16 to 18, the more the amount of the layered silicate added, the more the gas barrier properties are improved.

Comparative Example 3

Somasif MEE was used as a layered silicate, and the mixing ratio thereof was set to 0.03 part by mass which is below the range of the present invention. Except for that, a resin composition was prepared and a foam sheet was produced in the same manner as in Example 1.

Properties of the resin composition and the foamed article obtained are shown in Tables 3-2.

Comparative Example 4

Somasif MEE was used as a layered silicate, and the mixing ratio thereof was set to 22 parts by mass which is beyond the range of the present invention. Although it was attempted to prepare a foam sheet in the same manner as in Example 1 except for the above, the viscosity of the resin composition was too low and the resin composition could not be extruded or formed into a sheet.

In Comparative Example 3, because the content of the layered silicate was too low, the oxygen permeability coefficient was increased and the modulus of strain hardening was decreased, and the mechanical strength was thus not improved.

In Comparative Example 4, because the content of the layered silicate was too high, the viscosity was insufficient and the gas barrier properties were degraded. Further, bubbles were broken and a foam sheet having a uniform thickness was not obtained as described above.

TABLE 3-2

|  |  | Com. Ex. 3 | Com. Ex. 4 |
|---|---|---|---|
| biodegradable polyester resin | kind | A | A |
|  | part(s) by mass | 100 | 100 |
| (meth) acrylic acid ester compound | kind | I | I |
|  | part(s) by mass | 0.10 | 0.10 |
| Layered silicate | kind | 4. | 4. |
|  | part(s) by mass | 0.03 | 22 |
| operationability |  | good | good |
| MFR | g/10 minutes | 1.4 | 2.5 |
| crystallization rate index | minute | 0.2 | 4.6 |
| modulus of strain hardening |  | 0.4 | 12 |
| flexural modulus | GPa | 3.2 | 4.4 |
| oxygen permeability coefficient | ml · mm/m$^2$ · day · MPa | 190 | 70 |
| expansion ratio |  | 3.5 | — (bubbles broken) |
| appearance of foamed article |  | good | poor |
| sheet size: thickness × sheet width | Mm × mm | 3 × 65 | — |

Example 19

100 parts by mass of A: polylactic acid (weight average molecular weight 140,000, L-type 99%, D-type 1%, melting point 168° C., MFR 11 g/10 minutes) which is a biodegradable polyester resin, 4 parts by mass of Somasif MEE which is a layered silicate, 1.5 parts by mass of fine talc powder having an average particle size of 1.0 μm (available from NIPPON TALC CO.,LTD.) which is a nucleating agent, and 1.0% by mass, based on the resin component, of powder of 2,5-dimethyl-2,5-bis(t-butylperoxy)hexyne-3 diluted with inert solid which is a peroxide were dry-blended using the twin-screw kneading extruder used in Example 1, and supplied to the extrusion feeder. Subsequently, a mixed solution of 0.1 part by mass of PEGDM which is a (meth)acrylic acid ester compound and acetyl tributyl citrate which is a plasticizer was prepared so that the proportion thereof was 1:5 parts by mass. The obtained mixed solution was supplied to the middle part of the extruder using a liquid metering pump. The dry-blended resin and the mixed solution were melt-kneaded, extruded, pelletized and then dried to give a biodegradable polyester resin composition.

The obtained biodegradable polyester resin composition was introduced into a batch foaming machine (made by Taiatsu Techno Corporation, autoclave 500 ml). The composition was set temperature to 150° C. and the carbon dioxide gas injection pressure was set to 15 MPa, and after 60 minutes of carbon dioxide gas injection, the pressure was released at once to prepare a carbon dioxide gas batch foamed article.

Properties of the resin composition and the foamed article obtained are shown in Table 4.

TABLE 4

|  |  | Ex. 19 | Ex. 20 |
|---|---|---|---|
| biodegradable polyester resin | kind | A | A |
|  | part(s) by mass | 100 | 100 |
| (meth) acrylic acid ester compound | kind | I | I |
|  | part(s) by mass | 0.10 | 0.10 |
| layered silicate | kind | 4. | 4. |
|  | part(s) by mass | 4 | 4 |
| operationability |  | good | good |
| MFR | g/10 minutes | 0.9 | 0.9 |
| crystallization rate index | minute | 0.5 | 0.5 |
| modulus of strain hardening |  | 18 | 18 |
| flexural modulus | GPa | 4.2 | 4.2 |
| expansion ratio |  | 34 | 54 |
| appearance of foamed article |  | good | good |

Example 20

Butane gas was used as a foaming agent instead of carbon dioxide gas. Except for that, a batch foamed article was prepared in the same manner as in Example 19.

Properties of the resin composition and the foamed article obtained are shown in Table 4.

In Example 19, the composition had a high crystallization rate and a high modulus of strain hardening because the viscosity increasing effect by the (meth)acrylic acid ester compound was high, and a foamed article having closed cells with a high expansion ratio was obtained.

In Example 20, the butane gas used as the foaming agent had a high solubility in the resin, and thus a foamed article having closed cells with a high expansion ratio was obtained.

Example 21

The biodegradable polyester resin composition obtained in Example 19 was melt-kneaded at a melting temperature of 210° C. using a foam sheet production machine of twin screw kneader type (made by TOSHIBA MACHINE CO. LTD. TEM48BS type, die lip distance: 0.3 mm, circular die output diameter: 160 mmϕ). A sheet was prepared under conditions of a cooling zone temperature of 140° C., a die temperature of 160° C., a carbon dioxide gas concentration of 2.0%, a discharge amount of 50 Kg/h by two-shot molding of a sheet width of 640 mm×2 at a take up rate of 1.5 m/minute.

The obtained foam sheet had a thickness of 2.0 mm, was uniform and had closed cells with an expansion ratio of 7.5 times. The foam sheet had a flexural modulus of 4.4 Gpa, which was excellent in mechanical strength.

A food tray (drawing ratio of container (L/D): 1:5) was prepared from the foam sheet using a thermoforming machine (made by Asano Laboratories Co., Ltd.) with a mold for lid-container integral molding. Specifically, the sheet temperature was set to 130° C., and after heating for 10 seconds, the sheet was transferred to the mold and subjected to vacuum molding for 5 seconds at a mold temperature of 110° C. to prepare a molded article.

The obtained molded article had no molding flaw and was a uniformly foamed food tray. The expansion ratio of the tray was 7.3 times which was the same as the expansion ratio of the sheet before molding.

Further, an appropriate amount of water was poured on the tray and the tray was treated in a microwave oven (output 500 W) for 3 minutes. As a result, there was little deformation or contraction in the tray after treatment.

Examples 22 and 23

Using the biodegradable polyester resin composition obtained in Example 2 in Example 22, and the biodegradable polyester resin composition obtained in Example 19 in Example 23, injection molding was performed with an injection molding machine (made by TOSHIBA MACHINE CO. LTD., IS-100E) to form a release-type cup (diameter 38 mm, height 300 mm). The cycle time for the cup to be released was measured at a molding temperature of 200° C. and a mold temperature of 110° C.

The obtained measurement results are shown in Table 5.

TABLE 5

|  |  | Ex. 22 | Ex. 23 | Com. Ex. 5 | Com. Ex. 6 | Com. Ex. 7 |
|---|---|---|---|---|---|---|
| biodegradable polyester resin | kind | A | A | A | A | A |
|  | part(s) by mass | 100 | 100 | 100 | 100 | 100 |
| (meth) acrylic acid ester compound | kind | I | I | — | I | — |
|  | part(s) by mass | 1.0 | 0.10 | — | 0.10 | — |
| layered silicate | kind | 3. | 4. | 3. | 4. | — |
|  | part(s) by mass | 4 | 4 | 4 | 0.03 | — |
| operationability |  | good | good | good | Good | — |
| MFR | g/10 minutes | 1.3 | 0.9 | 11.8 | 1.4 | 11 |
| crystallization rate index | minute | 2 | 0.5 | 32 | 0.2 | 110 |
| modulus of strain hardening |  | 14 | 18 | 1.03 | 0.4 | — |
| molding cycle | second | 45 | 40 | 120 | 55 | 600 or more |

In examples 22 and 23, the crystallization rate was improved and the molding cycle time was shortened due to the synergistic effect of the layered silicate and the (meth) acrylic acid compound.

Comparative Examples 5 and 6

In Comparative Example 5, the biodegradable polyester resin composition obtained in Comparative Example 1 was used, and in Comparative Example 6, the biodegradable polyester resin composition obtained in Comparative Example 3 was used. Except for that, injection molding was performed in the same manner as in Example 22, and the cycle time taken for the cup to be released was measured.

The obtained measurement results are shown in Table 5.

Comparative Example 7

The biodegradable polyester used in Example 1 alone was used without mixing the (meth)acrylic acid ester compound or the layered silicate. Injection molding was to be performed in the same manner as in Example 22 except for the above, but was impossible because the operationability was poor.

In Comparative Example 5, because no (meth)acrylic acid ester compound was mixed, the crystallization rate was extremely low and the molding cycle was greatly lowered.

In Comparative Example 6, because the mixing ratio of the layered silicate was too small, the rigidity at higher temperature of the composition was insufficient and there was a problem with removal of the molded article, and this lowered operationability of injection molding.

In Comparative Example 7, because no (meth)acrylic acid ester compound or a layered silicate was mixed, the composition had no strain hardening property and had a low crystallization rate, and the operation was completely impossible as described above.

Examples 24 and 25

Using the biodegradable polyester resin composition obtained in Example 2 in Example 24, and the biodegradable polyester resin composition obtained in Example 19 in Example 25, preform 30 mm in diameter, 100 mm in height and 3.5 mm in thickness was prepared by a blow molding machine (made by NISSEI ASB MACHINE CO., LTD., ASB-50HT) under a condition of a molding temperature of 200° C. Then, the obtained preform was heated so that the surface temperature was 80° C. and blow-molded into a bottle-shaped mold (diameter 90 mm, height 250 mm) to obtain a molded article 0.35 mm in thickness.

The obtained measurement results are shown in Table 6.

TABLE 6

|  |  | Ex. 24 | Ex. 25 | Com. Ex. 8 | Com. Ex. 9 | Com. Ex. 10 |
|---|---|---|---|---|---|---|
| biodegradable polyester resin | kind | A | A | A | A | A |
|  | part(s) by mass | 100 | 100 | 100 | 100 | 100 |
| (meth) acrylic acid ester compound | kind | I | I | — | I | — |
|  | part(s) by mass | 1.0 | 0.10 | — | 0.10 | — |
| layered silicate | kind | 3. | 4. | 3. | 4. | — |
|  | part(s) by mass | 4 | 4 | 4 | 0.03 | — |
| operationability |  | good | good | good | Good | — |
| MFR | g/10 minute | 1.3 | 0.9 | 11.8 | 1.4 | 11 |
| crystallization rate index | minute | 2 | 0.5 | 32 | 0.2 | 110 |
| modulus of strain hardening |  | 14 | 18 | 1.03 | 0.4 | — |
| blow moldability |  | good | good | moderate | moderate | poor |

In Examples 24 and 25, the crystallization rate was high and the blow moldability was excellent due to the synergistic effect of the layered silicate and the (meth)acrylic acid ester compound.

Comparative Examples 8 and 9

In Comparative Example 8, the biodegradable polyester resin composition obtained in Comparative Example 1 was used and in Comparative Example 9, the biodegradable polyester resin composition obtained in Comparative Example 3 was used. Except for that, blow molding was performed in the same manner as in Example 24.

The obtained measurement results are shown in Table 6.

Comparative Example 10

The biodegradable polyester used in Example 1 alone was used without mixing the (meth)acrylic acid ester compound or the layered silicate. Blow molding was to be performed in the same manner as in Example 24 except for the above, but was impossible because the operationability was poor.

In Comparative Example 8, because no (meth)acrylic acid ester compound was mixed, only a composition having a high MFR and low crystallization rate was obtained, and the blow moldability was poor. Further, the obtained molded article was defective.

In Comparative Example 9, because the mixing ratio of the layered silicate was too small, the rigidity at higher temperature of the composition was insufficient and there was a problem with removal of the molded article, for example and this lowered operationability. And the obtained molded article was partially defective.

In Comparative Example 10, because no (meth)acrylic acid ester compound or a layered silicate was mixed, the composition had no strain hardening property and had a low crystallization rate, and blow molding was completely impossible as described above. Thus, the intended molded article could not be obtained.

Examples 26 and 27

Using the biodegradable polyester resin composition obtained in Example 2 in Example 26, and the biodegradable polyester resin composition obtained in Example 19 in Example 27, a molded plate 50 mm in width and 2.0 mm in thickness was prepared by an extrusion molding machine (made by Ikegai Corporation, PCM-30) under a condition of a molding temperature of 210° C.

The obtained measurement results are shown in Table 7.

TABLE 7

|  |  | Ex. 26 | Ex. 27 | Com. Ex. 11 | Com. Ex. 12 | Com. Ex. 13 |
|---|---|---|---|---|---|---|
| biodegradable polyester resin | kind | A | A | A | A | A |
|  | part(s) by mass | 100 | 100 | 100 | 100 | 100 |
| (meth) acrylic acid ester compound | kind | I | I | — | I | — |
|  | part(s) by mass | 1.0 | 0.10 | — | 0.10 | — |
| layered silicate | kind | 3. | 4. | 3. | 4. | — |
|  | part(s) by mass | 4 | 4 | 4 | 0.03 | — |
| Operationability |  | good | good | good | Good | — |
| MFR | g/10 minute | 1.3 | 0.9 | 11.8 | 1.4 | 11 |
| crystallization rate index | minute | 2 | 0.5 | 32 | 0.2 | 110 |

TABLE 7-continued

|  | Ex. 26 | Ex. 27 | Com. Ex. 11 | Com. Ex. 12 | Com. Ex. 13 |
|---|---|---|---|---|---|
| modulus of strain hardening | 14 | 18 | 1.03 | 0.4 | — |
| extrusion moldability | good | good | moderate | moderate | poor |

In Examples 26 and 27, the crystallization rate was high and the extrusion moldability was excellent due to the synergistic effect of the layered silicate and the (meth)acrylic acid ester compound.

Comparative Examples 11 and 12

In Comparative Example 11, the biodegradable polyester resin composition obtained in Comparative Example 1 was used, and in Comparative Example 12, the biodegradable polyester resin composition obtained in Comparative Example 3 was used.

Except for that, extrusion molding was preformed in the same manner as in Example 26.

The obtained measurement results are shown in Table 7.

Comparative Example 13

The biodegradable polyester used in Example 1 alone was used without mixing the (meth)acrylic acid ester compound or the layered silicate. Extrusion molding was to be performed in the same manner as in Example 26 except for the above but was impossible because the operation ability was poor.

In Comparative Example 11, because no (meth)acrylic acid ester compound was mixed, the obtained composition had a high MFR, a low crystallization rate and poor extrusion moldability, and the obtained plate was deflected.

In Comparative Example 12, because the mixing ratio of the layered silicate was too small, the rigidity at higher temperature of the compound was insufficient to cause deflection of the plate, meaning that a molded article of the desired shape was not obtained.

In Comparative Example 13, because no (meth)acrylic acid ester compound or layered silicate was mixed, the composition had no strain hardening property and had a low crystallization rate, and extrusion molding was completely impossible as described above. Thus, the intended molded article could not be obtained.

The invention claimed is:

1. A biodegradable polyester resin composition comprising 100 parts by mass of a biodegradable polyester resin containing not less than 50% by mole of an α- and/or β-hydroxycarboxylic acid unit, 0.01 to 10 parts by mass of a (meth)acrylic acid ester compound and 0.1 to 10 parts by mass of at least one a layered silicate selected from a group consisting of smectite, vermiculite, swellable fluoromica, kanemite, makatite, magadiite and kenyte and treated by at least one organic cation.

2. The biodegradable polyester resin composition according to claim 1, wherein a crystallization rate index is not more than 30 (minutes).

3. The biodegradable polyester resin composition according to claim 1, wherein the (meth)acrylic acid ester compound contains at least two (meth)acrylic groups or at least one (meth)acrylic group and at least one glycidyl group or vinyl group.

4. The biodegradable polyester resin composition according to claim 1, wherein the α- and/or β-hydroxycarboxylic acid unit is D-lactic acid, L-lactic acid or a mixture thereof.

5. The biodegradable polyester resin composition according to claim 1, wherein, in a time-elongational viscosity curve obtained by measuring elongational viscosity of the biodegradable polyester resin composition at a temperature 10° C. higher than the melting point of the biodegradable polyester resin composition, a ratio of a gradient $a_1$ in a linear region at an initial stage of elongation before appearance of a bending point to a gradient $a_2$ of a later stage of elongation after the bending point (modulus of strain hardening=$a_2/a_1$) is 1.05 to less than 50.

6. A process for producing a biodegradable polyester resin composition according to claim 1, wherein
said process comprises melt-kneading a layered silicate with a biodegradable polyester resin and then melt-kneading a (meth)acrylic acid ester compound and a peroxide therewith.

7. A process for producing a biodegradable polyester resin composition according to claim 1, wherein
said process comprises melt-kneading a layered silicate with a biodegradable polyester resin and then pouring a solution or a dispersion of a (meth)acrylic acid ester compound thereinto, followed by melt-kneading.

8. A process for producing a biodegradable polyester resin composition according to claim 1, wherein
said process comprises melt-kneading a layered silicate with a biodegradable polyester resin and then pouring a solution or a dispersion of a (meth)acrylic acid ester compound and a peroxide thereinto, followed by melt-kneading.

9. A biodegradable resin foamed article obtained by foam molding of a biodegradable polyester resin composition according to claim 1.

10. A biodegradable resin molded article obtained by any of injection molding, extrusion molding and blow molding of a biodegradable polyester resin composition according to claim 1.

* * * * *